(12) United States Patent
He et al.

(10) Patent No.: US 10,556,611 B2
(45) Date of Patent: Feb. 11, 2020

(54) DOUBLE STROLLER

(71) Applicant: GOODBABY CHILD PRODUCTS CO., LTD., Kunshan (CN)

(72) Inventors: Xinjun He, Kunshan (CN); Fusheng Ma, Kunshan (CN)

(73) Assignee: GOODBABY CHILD PRODUCTS CO., LTD., Kunshan (CN)

(*) Notice: Subject to any disclaimer, the term of this patent is extended or adjusted under 35 U.S.C. 154(b) by 0 days.

(21) Appl. No.: 16/092,762

(22) PCT Filed: Nov. 28, 2016

(86) PCT No.: PCT/CN2016/107402
§ 371 (c)(1),
(2) Date: Oct. 11, 2018

(87) PCT Pub. No.: WO2017/177684
PCT Pub. Date: Oct. 19, 2017

(65) Prior Publication Data
US 2019/0118847 A1  Apr. 25, 2019

(30) Foreign Application Priority Data
Apr. 11, 2016  (CN) .......................... 2016 1 0220166

(51) Int. Cl.
*B62B 7/08* (2006.01)
*B62B 7/00* (2006.01)
(Continued)

(52) U.S. Cl.
CPC .............. *B62B 7/086* (2013.01); *B62B 7/008* (2013.01); *B62B 7/08* (2013.01); *B62B 7/083* (2013.01);
(Continued)

(58) Field of Classification Search
CPC ......... B62B 7/086; B62B 7/008; B62B 7/083; B62B 2205/02; B62B 2205/04; B62B 2205/06
See application file for complete search history.

(56) References Cited

U.S. PATENT DOCUMENTS 4,538,830 A   9/1985  Nakao et al.
4,697,823 A  10/1987  Kassai
(Continued)

FOREIGN PATENT DOCUMENTS

CN         1363489 A   8/2002
CN       201245172 Y   5/2009
(Continued)

*Primary Examiner* — Erez Gurari
(74) *Attorney, Agent, or Firm* — Soroker Agmon Nordman Pte Ltd

(57) ABSTRACT

The present disclosure relates to a double stroller, with a frame thereof including three side supports and two transverse supports. Each two adjacent side supports are connected to each other via one transverse support. Each transverse support includes at least one connecting rod assembly, and each connecting rod assembly includes an outer connecting rod fixedly connected with the side support on a left or right side and an inner connecting rod fixedly connected with the side support in the middle. The outer connecting rod is connected to the inner connecting rod in a horizontally rotatable manner. The outer connecting rods and inner connecting rods connected in a horizontally rotatable manner to enable the side supports on two sides to close together as the outer connecting, rods are turned transversely and folded, and thus, after being folded, the space occupied by the double stroller in the left-right direction is lessened.

16 Claims, 9 Drawing Sheets

(51) Int. Cl.
  *B62B 9/10* (2006.01)
  *B62B 9/20* (2006.01)
(52) U.S. Cl.
  CPC ............... *B62B 9/102* (2013.01); *B62B 9/20* (2013.01); *B62B 2202/42* (2013.01); *B62B 2205/02* (2013.01); *B62B 2205/04* (2013.01); *B62B 2205/06* (2013.01); *B62B 2205/26* (2013.01)

(56) References Cited

U.S. PATENT DOCUMENTS

| | | | | |
|---|---|---|---|---|
| 5,676,419 A | * | 10/1997 | Kassai | B62B 7/08 297/44 |
| 6,752,405 B1 | | 6/2004 | Wright | |
| 7,516,966 B2 | | 4/2009 | Gray | |
| 8,899,615 B2 | * | 12/2014 | Dijkstra | B62B 7/14 280/42 |
| 2002/0000710 A1 | * | 1/2002 | Kaneko | B62B 7/06 280/647 |
| 2002/0033588 A1 | * | 3/2002 | Kaneko | B62B 7/08 280/650 |
| 2008/0179863 A1 | * | 7/2008 | Schonfeld | B62B 7/12 280/642 |
| 2010/0013281 A1 | * | 1/2010 | Chen | B62B 7/14 297/243 |
| 2014/0265258 A1 | * | 9/2014 | Lalehzri | B62B 7/008 280/658 |
| 2015/0175188 A1 | | 6/2015 | Rembisz et al. | |
| 2019/0118847 A1 | * | 4/2019 | He | B62B 9/20 |

FOREIGN PATENT DOCUMENTS

| | | |
|---|---|---|
| CN | 103507846 A | 1/2014 |
| CN | 204775399 U | 11/2015 |
| CN | 105346586 A | 2/2016 |
| CN | 105460065 A | 4/2016 |
| CN | 105857379 A | 8/2016 |
| CN | 205632633 U | 10/2016 |
| DE | 202013100540 U1 | 4/2013 |
| WO | 2007131222 A2 | 11/2007 |

* cited by examiner

DOUBLE STROLLER

RELATED APPLICATIONS

The present application claims priority as a US national phase under 35 U.S.C. 363 of PCT/CN2016/107402 filed on Nov. 28, 2016, the disclosure of which is incorporated herein by reference.

FIELD OF INVENTION

The present disclosure relates to a double stroller.

BACKGROUND OF THE INVENTION

A double stroller in the prior art, comprises a stroller frame having an unfolded position and a folded position, a front wheel assembly and a rear wheel assembly disposed at lower portions of the stroller frame, a human body support device on the stroller frame capable of supporting the human body, and a locking device for locking the stroller frame in the unfolded position. The existing double strollers have a wide variety of stroller frames, the numbers of rods of the stroller frame are different, the connection relationships and the connection positions of the rods are different, and thus the folding mechanism and the folding patterns are different. Due to the structure limitation of the existing stroller frames, the folding of the current double strollers are all partially folded, and the structures of the folded double strollers are not compact enough and occupy large spaces, and thus not easy to carry and transport.

SUMMARY OF THE INVENTION

The technical problems to be solved by present disclosure is to provide a double stroller with a simple structure, convenient for folding and having a small volume after being folded.

To solve the above technical problems, a technical solution employed by the present disclosure is: a double stroller, comprising a frame with an unfolded state and a folded state, front wheels arranged below a front portion of the frame, rear wheels arranged below a rear portion of the frame, and a lock mechanism for locking the frame in the unfolded state. The frame comprises side supports and transverse supports; there are three side supports arranged side by side in sequence, and each two adjacent side supports are connected to each other via one transverse support; the transverse supports comprise a plurality of connecting rod assemblies arranged transversely, and the connecting rod assemblies comprise outer connecting rods fixedly connected with the side support on a either side of the double stroller and inner connecting rods fixedly connected with the side support in the middle of the double stroller, the outer connecting rods are rotatably connected with the inner connecting rods, and the outer connecting rods and the inner connecting rods can be unfolded and folded; when the transverse supports are unfolded/folded, the outer connecting rods of the connecting rod assemblies are turned transversely and rotated at the rotating joints of the outer connecting rods and the inner connecting rods, and the side supports on two sides of the double stroller are turned and get unfolded/folded along a direction away from/close to the side support in the middle of the double stroller along with the rotation of the outer connecting rods; when the transverse supports are in the unfolded state, the side supports can be unfolded and folded along the side planes in which they are located; and when any one of the three side supports is unfolded/folded, the other two side supports can synchronously be unfolded or folded under the driving of the transverse supports.

Further, the side supports further comprise front wheel supports with their lower portions connected with the front wheels, and rear wheel supports with their lower portions connected with the rear wheels, side armrests, first connecting rods, second connecting rods and push rod assemblies, upper portions of the front wheel supports and upper portions of the rear Wheel support are rotatable connected, the push rod assemblies are connected with the rear wheel supports via the first connecting rods, and the first connecting rods are respectively rotatably connected with the rear wheel supports and the push rod assemblies, the side armrests are respectively rotatably connected with the rear wheel supports and the push rod assemblies, the second connecting rods are respectively rotatably connected with the front wheel supports and the first connecting rods; the side armrest, the push rod assembly, the first connecting rod and the rear wheel support of each side support form a four-bar linkage, and the front wheel support, the rear wheel support, the first connecting rod and the second connecting rod of each side support form another four-bar linkage; when the side supports are in the unfolded state, the front wheel supports and the rear wheel supports are unfolded with respect to each other to support, the front wheel supports are supported on the ground via the front wheels, the rear wheel supports are supported on the ground via the rear wheels, the side armrests and the first connecting rods respectively stand obliquely on the rear wheel supports, the push rod assemblies are supported on the side armrests and the upper portion of the first connecting rods, and two of and only two connected components of the front wheel supports, the rear wheel supports, the side armrests, the push rod assemblies, the first connecting rods and the second connecting rods are locked with respect with each other via the lock mechanism; when the side supports are in the folded state, the lock mechanism are unlocked, and the front wheel support, the rear wheel support, the side armrest, the push rod assembly, the first connecting rod, and the second connecting rod of each side support are all drawn close and folded together; when the side supports are unfolded or folded, the lock mechanism are unlocked, and any one of the front wheel, supports, the rear wheel supports, the side armrests, the push rod assemblies, the first connecting rods, and the second connecting rods moves, and the other ones are driven to move together.

Further, the push rod assemblies comprise lower push rods with their lower portions rotatably connected with the first connecting rods, and upper push rods slidably connected with the lower push rods, and the upper push rods can slide up and down along a length direction of the lower push rods.

Preferably, one of the upper push rod and the lower push rod has a tube structure, the other one is inserted into the tube structure, and the upper push rod and the lower push rod can slide with respect to each other.

In particular, upper portions of the first connecting rods are rotatably connected with lower portions of the push rod assemblies, and upper portions of the side armrests are rotatably connected with the push rod assemblies, and the joints of the side armrests on the push rod assemblies are higher than the joints of the first connecting rods on the push rod assemblies, lower portions of the side armrests are rotatably connected with upper portions of the rear wheel supports, the first connecting rods are rotatably connected with the rear wheel supports near lower ends thereof, and the joints of the side armrests on the rear wheel supports are higher than the joints of the front wheel supports on the rear wheel supports and the joints of the first connecting rods on the rear wheel supports.

In particular, when the side supports are folded, the front wheel supports are rotated rearwards and get close to the rear wheel supports, the push rod assemblies are rotated frontwards and get close to the side armrests, and the side armrests are rotated downwards and get close to the rear wheel supports.

Preferably, the rear wheel supports comprise upper rear supports and lower rear supports, and lower portions of the upper rear supports are rotatably connected to upper portions of the lower rear supports, the front wheel supports, the first connecting rods and the side armrests are respectively rotatably connected with the upper rear supports, and the rear wheels are mounted at lower portions of the lower rear supports.

Further, the side supports have two kinds of folding patterns, and when the side supports are folded according to a first folding pattern, the upper rear supports and the lower rear supports are relatively unfolded and locked, the upper rear supports and the lower rear supports together are rotated with respect to the front wheel supports, the side armrests and the first connecting rods, and the front wheels are located underneath the rear wheels after folding; and when the side supports are folded according to a second folding pattern, the lower rear supports and the upper rear supports are unlocked with respect to each other, the lower rear supports are rotated and folded around the joints of the lower rear supports and the upper rear supports and get close to the upper rear supports, the upper rear supports and the lower rear supports together are rotated with respect to the front wheel supports, the side armrests and the first connecting rods, and the front wheels are located underneath the rear wheels.

In particular, the plurality of connecting rod assemblies comprise front wheel support connecting rod assemblies, rear wheel support connecting rod assemblies and push rod connecting rod assemblies; the front wheel support connecting rod assemblies comprise first outer connecting rods fixedly connected with the front wheel support at the either side of the double stroller, first inner connecting rods fixedly connected with the front wheel support in the middle of the double stroller, and the first outer connecting rods are rotatably connected with the first inner connecting rods; the rear wheel support connecting rod assemblies comprise second outer connecting rods fixedly connected with the rear wheel support at either side of the double stroller and second inner connecting rods fixedly connected with the rear wheel support in the middle of the double stroller, and the second outer connecting rods are rotatably connected with the second inner connecting rods; the push rod connecting rod assemblies comprise third outer connecting rods fixedly connected with the push rod assembly at either side of the double stroller and third inner connecting rods fixedly connected with the push rod assemblies in the middle of the double stroller, and the third outer connecting rods are rotatably connected with the third inner connecting rods; when the first outer connecting rods, the second outer connecting rods and the third outer connecting rods are turned to a direction close to/away from the side support in the middle of the double stroller, the side supports at two sides of the double stroller can be turned to the direction close to/away from the side support in the middle of the double stroller and get folded/unfolded along with the first outer connecting rods, the second outer connecting rods and the third outer connecting rods.

In particular, when the transverse supports are in the folded state, the shaft axis of rotating joint of the first outer connecting rod and the first inner connecting rod, the shaft axis of rotating joint of the second outer connecting rod and the second inner connecting rod, and the shaft axis of rotating joint of the third outer connecting rod and the third inner connecting rod of each transverse support are collinear or parallel.

In particular, the first outer connecting rods and/or the first inner connecting rods are disposed with first unidirectional rotation limit mechanisms thereon for restricting unidirectional rotation of the first outer connecting rods relative to the first inner connecting rods when the frame is unfolded; the second outer connecting rods and/or the second inner connecting rods are disposed with second unidirectional rotation limit mechanisms thereon for restricting unidirectional rotation of the second outer connecting rods relative to the second inner connecting rods when the frame is unfolded; the third outer connecting rods and/or the third inner connecting rods are disposed with third unidirectional rotation limit mechanisms thereon for restricting unidirectional rotation of the third outer connecting rods relative to the third inner connecting rods when the frame is unfolded.

Further, the transverse supports further comprise connecting rod assemblies of connecting rods, and the connecting rod assemblies of connecting rods comprise fourth outer connecting rods fixedly connected with the first connecting rod at either side of the double stroller and fourth inner connecting rods fixedly connected with the first connecting rod in the middle of the double stroller, and the fourth outer connecting rods are rotatable connected with the fourth inner connecting rods; when the frame is in the folded state, the shaft axes of rotating joints of the first outer connecting rods and the first inner connecting rods, the shaft axes of rotating joints of the second outer connecting rods and the second inner connecting rods, the shaft axes of rotating joints of the third outer connecting rods and the third inner connecting rods and the shaft axes of rotating joints of the fourth outer connecting rods and the fourth inner connecting rods are collinear or parallel.

In particular, the fourth outer connecting rods and/or the fourth inner connecting rods are disposed with fourth unidirectional rotation limit mechanisms thereon for restricting unidirectional rotation of the fourth outer connecting rods relative to the fourth inner connecting rods when the frame is unfolded.

In particular, when the frame are folded, the side supports can get close to each other and folded along the planes in which they are located; the side supports located at two sides of the double stroller are turned inward from the rotating joints of the outer connecting rods and the inner connecting rods towards inside the front of the frame after the side supports are folded, and the planes in which the front and rear wheels on the side supports at two sides of the double stroller intersect with the planes in which the front and rear wheels on the side supports in the middle of the double stroller.

Further, each two adjacent side supports are detachably mounted with one front armrest therebetween, and the front armrest is a U-shaped rod, one end of the front armrest is connected with the side armrest at either side of the double stroller, and the other end thereof is connected with the side armrest in the middle of the double stroller.

Preferably, the double stroller further comprises a handle fixedly disposed on the side support in the middle of the double stroller, and the handle is located between the front wheel support and the side armrest of the side support in the middle of the double stroller.

In particular, the handle is ring shaped, and an inner bore of the handle extends along the left-right direction of the double stroller.

The scope of the present disclosure is not limited to technical solutions specifically combined by the above technical features, and should encompass other technical solutions formed by any combination of the above technical features or the equivalent features thereof. For example, the technical scheme is formed by substituting between the above technical features and the technical features with similar functions disclosed by the present application.

Due to the use of the above technical solutions, the present disclosure has the following advantages over the prior art: By the connecting rod assemblies, three side supports with the same structure and arranged side by side can be folded synchronously, and the folding processes are unified; by the rotatable connections of the outer connecting rods and the inner connecting rods, the side supports on the two sides can be turned and folded together towards the side support in the middle along with the transverse turning of the outer connecting rods, and thus the transversely occupied space of the folded double stroller is reduced, and the folding of the three side supports enables the decrease in the structure sizes of the folded double stroller in the front-rear direction and in the up-down direction with respect to the unfolded state, and the folded double stroller overall occupies a small volume; the four-bar linkage formed by the side armrests, the push rod assemblies, the first connecting rods and the rear wheel supports of the side supports, and the four-bar linkage formed by the front wheel supports, the rear wheel supports, the first connecting rods and the second connecting rods enable that it just needs to drive one component to move to achieve linkage of other components when folding the side supports, and the folding operation of the side supports is simple and convenient.

Wherein, 1—front wheel support; 2—rear wheel support; 3—side armrest; 4—first connecting rod; 5—second connecting rod; 6—push rod assembly; 7—front wheel; 8—rear wheel; 9—front armrest; 10—handle; 21—upper rear support; 22—lower rear support; 61—upper push rod; 62—lower push rod; 100—side support; 200—transverse support; 201—first outer connecting rod; 202—first inner connecting rod; 203—second outer connecting rod; 204—second inner connecting rod; 205—third outer connecting rod; 206—third inner connecting rod; 27—fourth outer connecting rod; 208—fourth inner connecting rod.

DETAILED DESCRIPTION OF EXEMPLARY EMBODIMENTS

Figure 1:
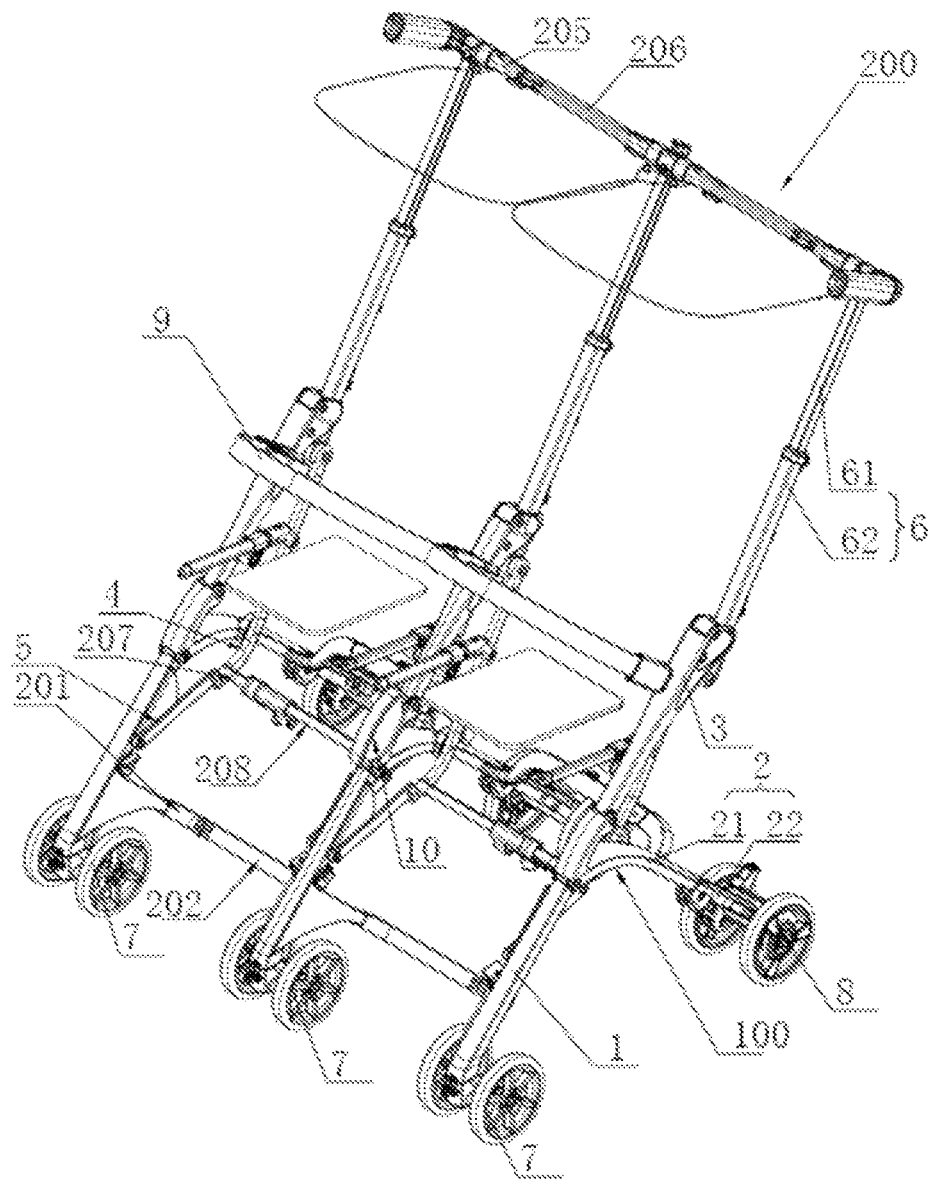
FIG. 1 is a schematic stereogram of a double stroller in a unfolded state of the present disclosure.
Figure 2:
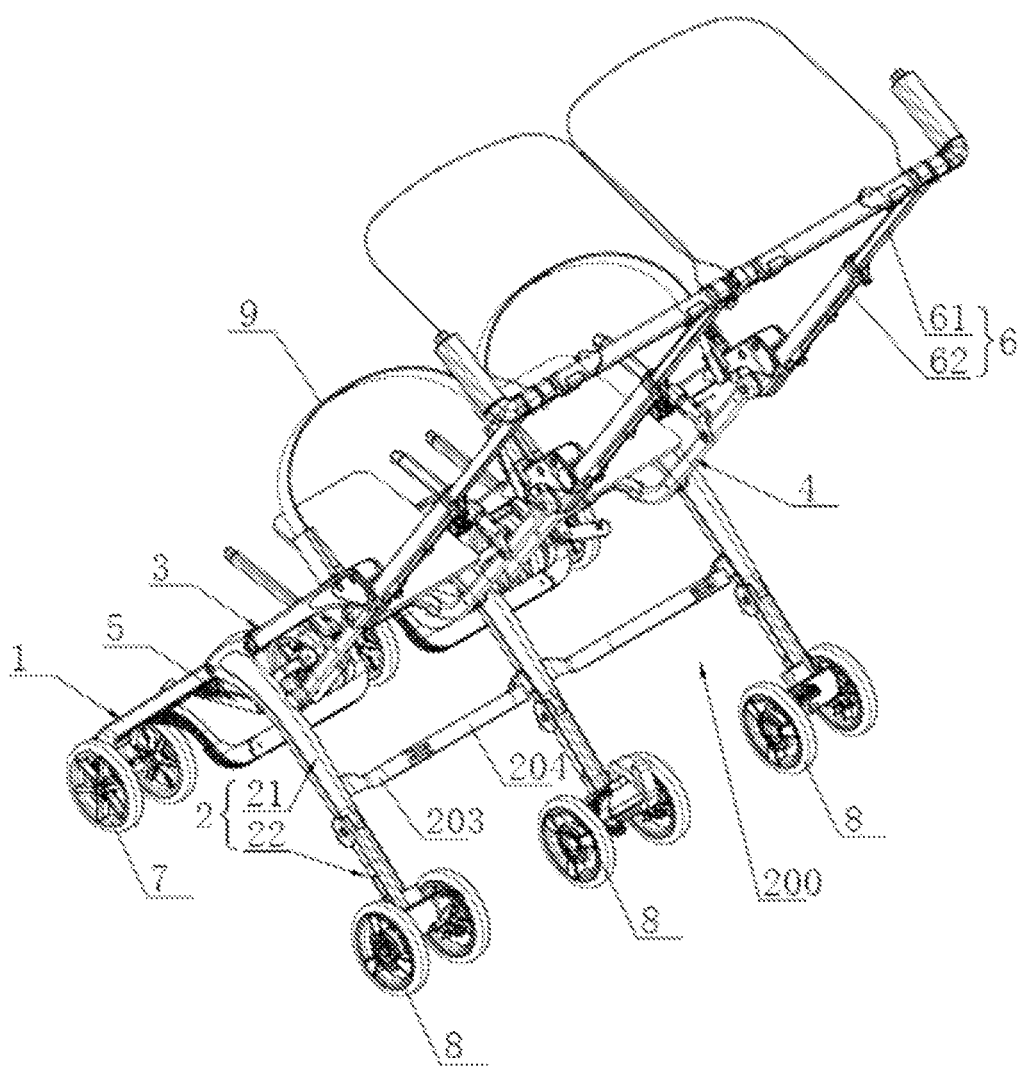
FIG. 2 is another schematic stereogram of the double stroller in the unfolded state of the present disclosure.
Figure 3:
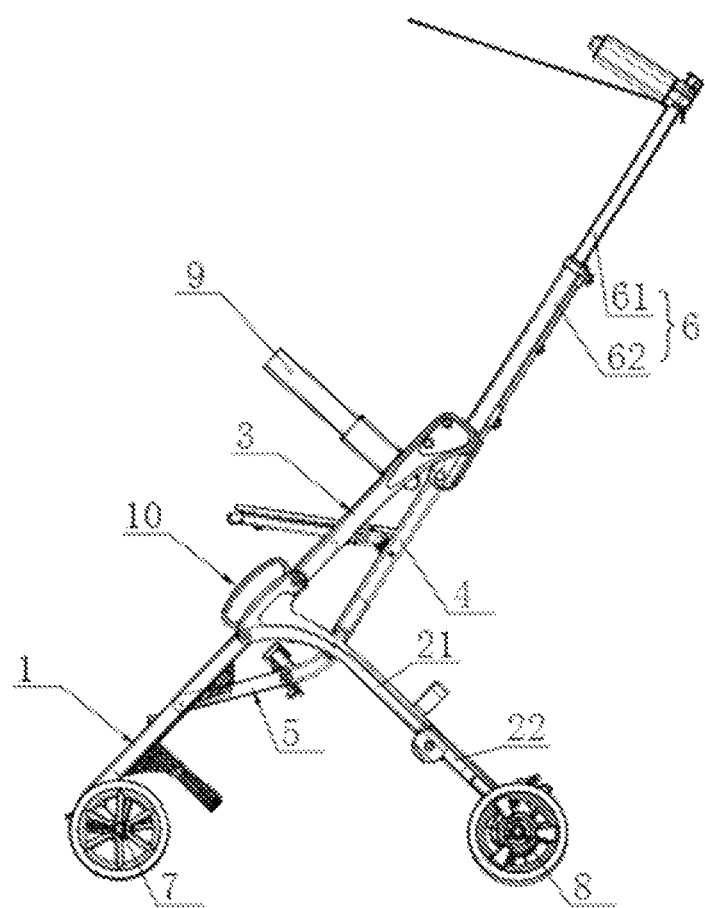
FIG. 3 is a side view of the double stroller in the unfolded state of the present disclosure.
Figure 4:
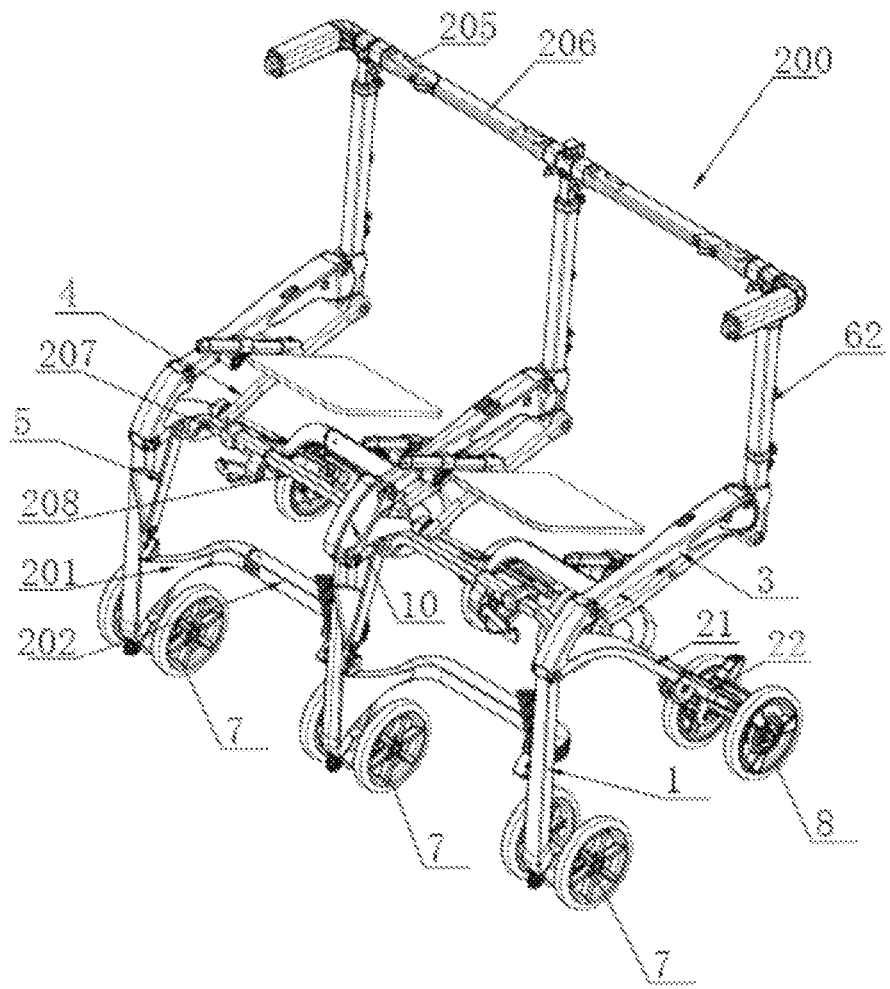
FIG. 4 is a schematic stereogram of the double stroller of the present disclosure during folding the side supports (the lower rear supports are not folded)
Figure 5:
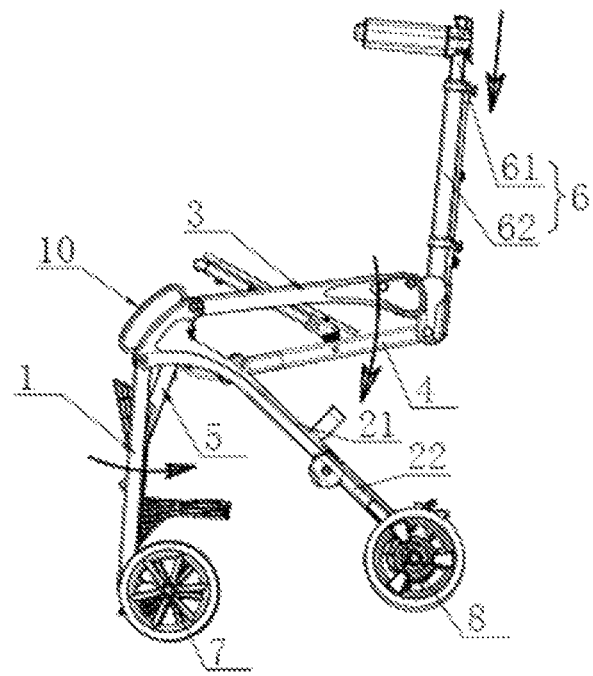
FIG. 5 is a side view of the double stroller of the present disclosure during folding the side supports (the lower rear supports are not folded)
Figure 6:
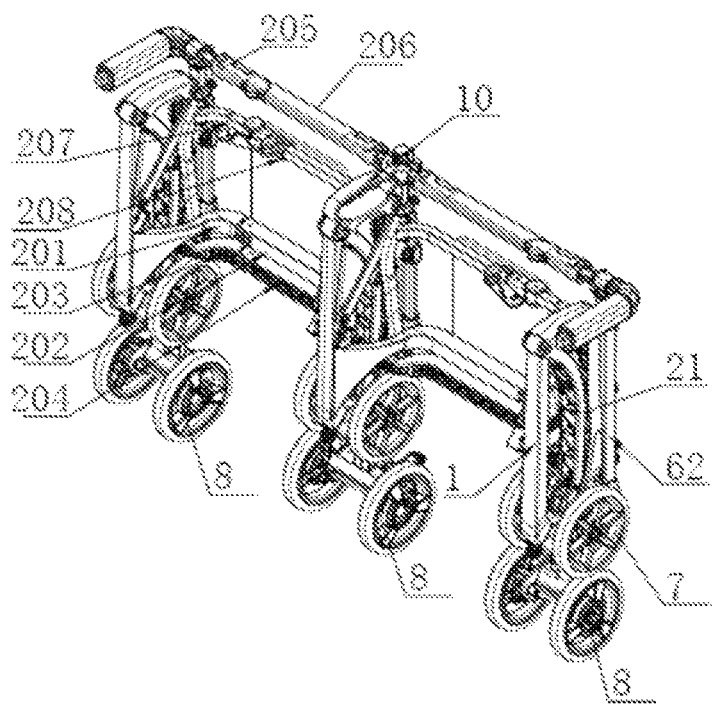
FIG. 6 is a schematic stereogram of the double stroller of the present disclosure after the side supports are folded (the lower rear supports are not folded)
Figure 7:
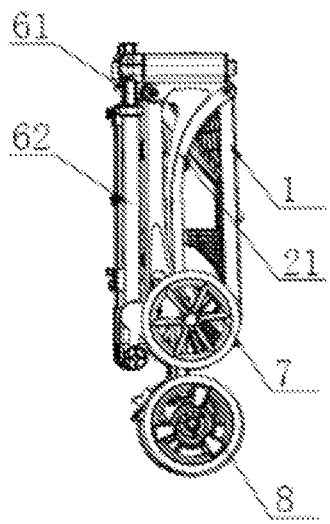
FIG. 7 is a side view of the double stroller of the present disclosure after the side supports are folded (the lower rear supports are not folded)
Figure 8:
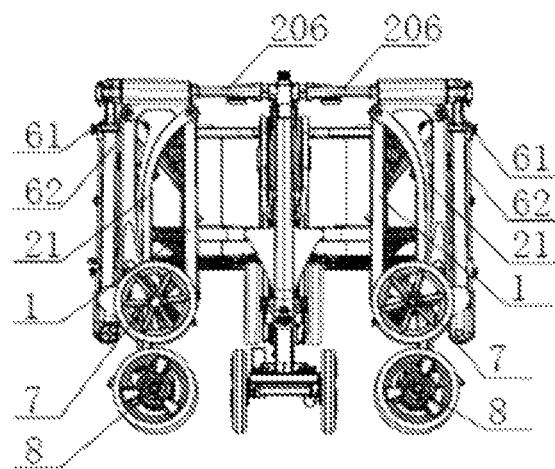
FIG. 8 is a front view of the double stroller in a folded state of the present disclosure (the lower rear supports are not folded)
Figure 9:
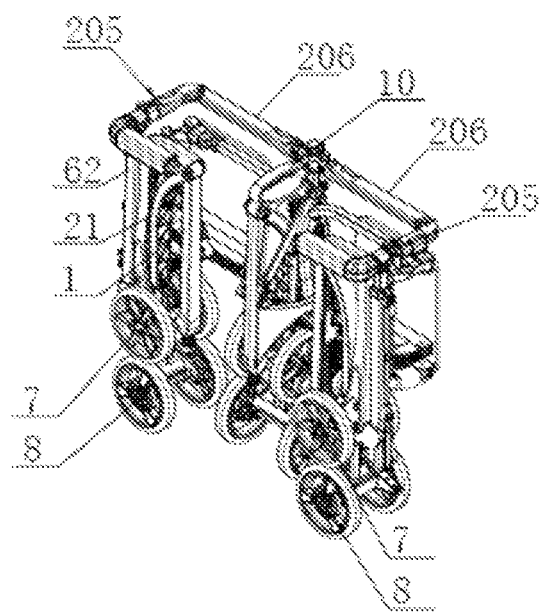
FIG. 9 is a schematic stereogram of the double stroller in a folded state of the present disclosure (the lower rear supports are not folded)
Figure 10:
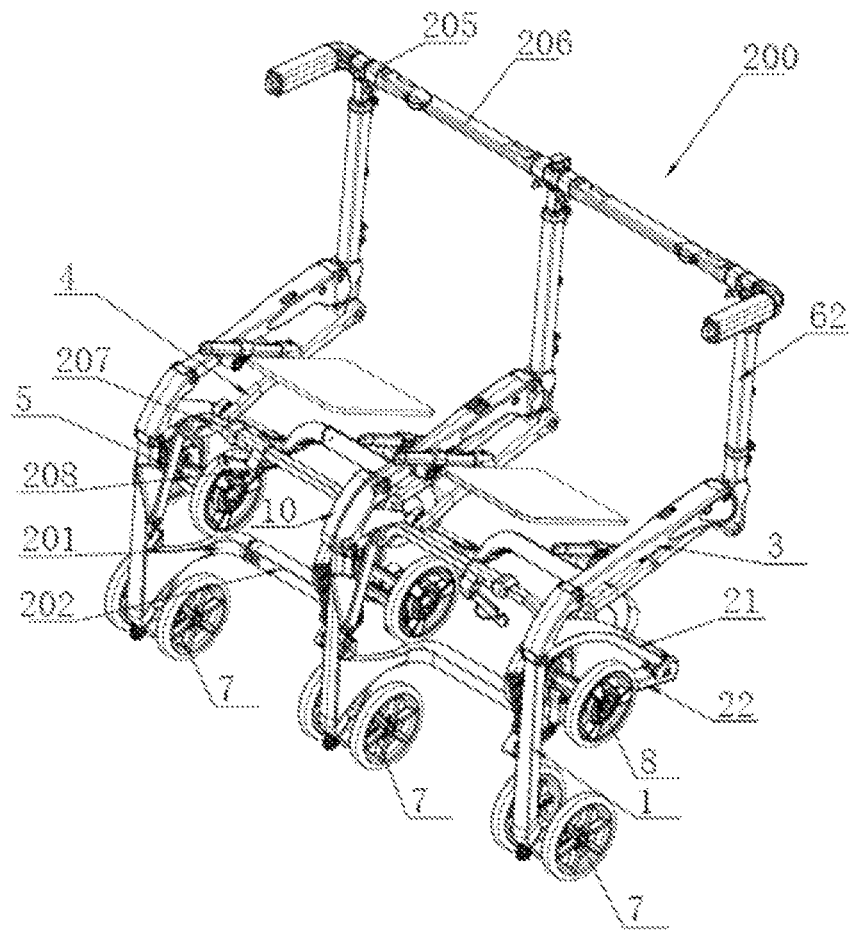
FIG. 10 is a schematic stereogram of the double stroller of the present disclosure during folding the side supports (the lower rear supports are folded)
Figure 11:
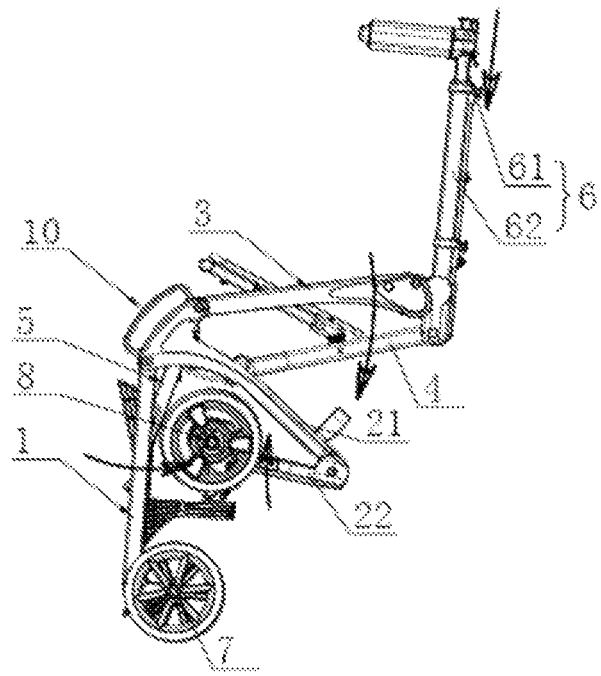
FIG. 11 is a side view of the double stroller of the present disclosure during folding the side supports (the lower rear supports are folded)
Figure 12:
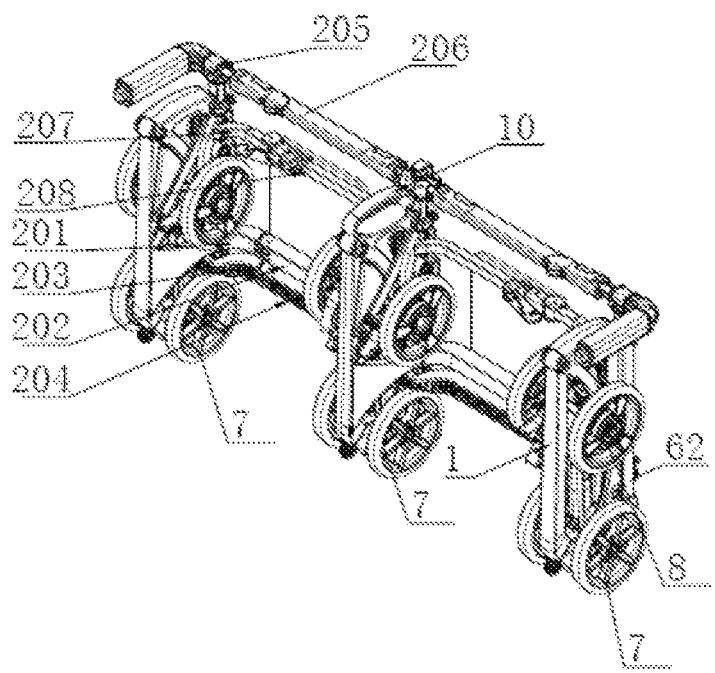
FIG. 12 is a schematic stereogram of the double stroller of the present disclosure after the side supports are folded (the lower rear supports are folded)
Figure 13:
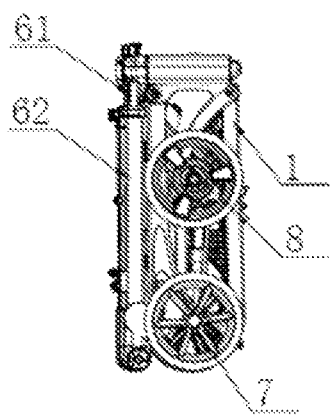
FIG. 13 is a side view of the double stroller of the present disclosure after the side supports are folded (the lower rear supports are folded)
Figure 14:
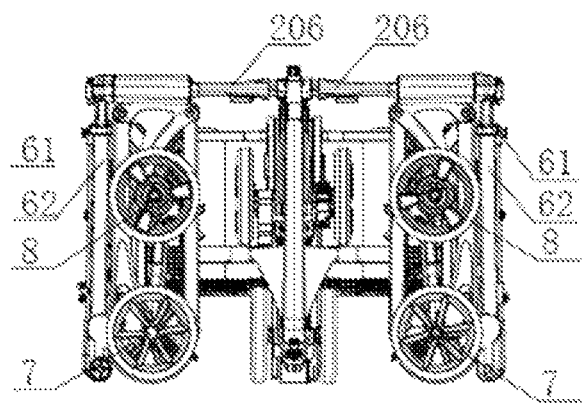
FIG. 14 is a front view of the double stroller in a folded state of the present disclosure (the lower rear supports are folded)
Figure 15:
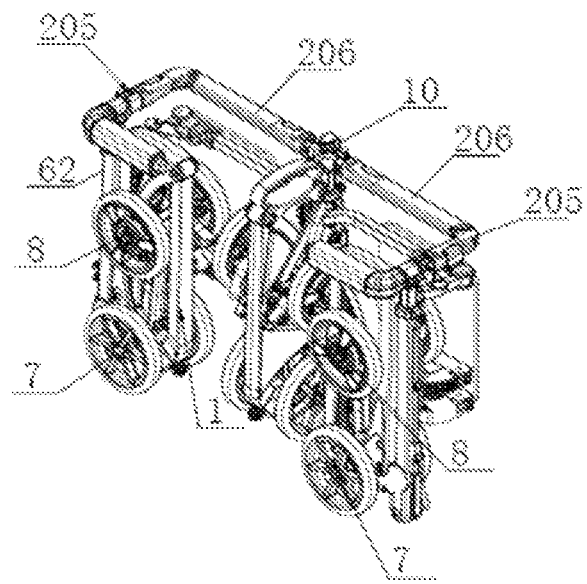
FIG. 15 is a schematic stereogram of the double stroller in a folded state of the present disclosure (the lower rear supports are folded)

In the following definition of the direction, it defined according to the usual viewing angle on the double stroller of a user and the person skilled in the art and for the convenience of description, and the specific direction is not limited. For example, the left-right direction corresponds to a direction perpendicular to the paper surface in FIG. 3, the up-down direction corresponds to the up-down direction of the paper surface in FIG. 3, and the front-rear direction corresponds to the left-right direction of the paper surface in FIG. 3, and the side close to the side support located in the middle is inner, and the side away from the side support located in the middle is outer.

As shown in FIG. 1 to FIG. 15, a double stroller of the present disclosure, comprises a frame with an unfolded state and a folded state, front wheels 7 arranged below a front portion of the frame, rear wheels 8 arranged below a rear portion of the frame, a lock mechanism for locking the frame in the unfolded state, and seats (not shown) arranged on the frame. The seats are mainly constituted by cloth cover.

The frame comprises three side supports 100 and two transverse supports 200. The side supports 100 are arranged side by side in sequence along the left-right direction, and each two adjacent side supports 100 are connected to each other via one transverse support 200. The transverse supports 200 comprise a plurality of connecting rod assemblies transversely arranged. The connecting rod assemblies comprise outer connecting rods fixedly connected with the side support 100 on either side of the double stroller and inner connecting rods fixedly connected with the side support 100 in the middle of the double stroller. The outer connecting rods are rotatably connected to the inner connecting rods via rotating shafts, and axes of the rotating shafts extend along a up-down direction. Each transverse support 200 comprises at least two connecting rod assemblies, and respective rotating joints of the outer connecting rods and the inner connecting rods at the same transverse support 200 are collinear in a direction perpendicular to an extension direction of the connecting rod assemblies (such as the up-down direction in FIG. 6). The outer connecting rods and the inner connecting rods can be unfolded and folded with respect to each other, such that the side supports (100) on the left and right sides can rotate inward along with the outer connecting rods to draw close to the side support (100) in the middle or rotate outward to unfold, and when any one of the three side supports (100) is unfolded or folded, the other two side supports (100) can be synchronously unfolded or folded under the driving of the transverse supports (200).

When the transverse supports 200 are unfolded/folded, the outer connecting rods of the connecting rod assemblies are turned transversely and rotated at the rotating joints of the outer connecting rods and the inner connecting rods, and the side supports 100 on two sides of the double stroller are turned and get unfolded/folded along a direction away from/close to the side support 100 in the middle of the double stroller along with the rotation of the outer connecting rods; when the transverse supports 200 are in the unfolded state, the side supports 100 can be unfolded and folded along the side planes in which they are located; and when any one of the three side supports 100 is unfolded/folded, the other two side supports 100 can be synchronously unfolded or folded under the driving of the transverse supports 200.

When the frame are folded, each side support 100 firstly get close and are folded along their own planes (the up-down direction and the front-rear direction) respectively, After the side supports 100 are folded, the side supports 100 located at two sides of the double stroller are turned inward from the rotating joints of the outer connecting rods and the inner connecting rods towards inside the front of the frame, to achieve folding (in the left-right direction) of the frame. After the frame is folded, the planes in which the front and rear wheels on the side supports 100 at two sides of the double stroller intersect with the planes in which the front and rear wheels on the side supports 100 in the middle of the double stroller, in practical use, the above mentioned intersecting planes almost vertically intersect.

In the present embodiment, each side support 100 comprises a front wheel support 1 with its lower portion connected with the front wheel 7, and a rear wheel support 2 with its lower portion connected with the rear wheel 8, a side armrest 3, a first connecting rod 4, a second connecting rod 5 and a push rod assembly 6.

Each push rod assembly 6 comprises a lower push rod 62 with its lower portions rotatably connected with the first connecting rod 4, and an upper push rod 61 slidably connected with the lower push rod 62, and the upper push rod 61 can slide up and down along a length direction of the lower push rod 62. One of the upper push rod 61 and the lower push rod 62 has a tube structure, the other one is inserted into the tube structure, and the upper push rod 61 and the lower push rod 62 can slide with respect to each other. In the present embodiment the lower push rod has a tube structure, and the upper push rod 61 is inserted into the lower push rod 62 from openings on the upper portion of the lower push rod 62, and the upper push rod 61 can slide up and down with respect to the lower push rod 62. Upper portions of the front wheel supports 1 and upper portions of the rear wheel supports 2 are rotatably connected, and lower push rods 62 are connected with the rear wheel supports 2 via the first connecting rods 4. The first connecting rods 4 are rotatable connected with lower portions of the lower push rods 62, and the first connecting rods 4 are rotatably connected with the rear wheel supports 2 near the lower ends thereof. Upper portions of the side armrests 3 are rotatably connected with the lower push rods 62, and joints of the side armrests 3 and the lower push rods 62 are higher than joints of the first connecting rods 4 and the lower push rods 62. Lower portions of the side armrests 3 are rotatably connected with upper portions of the rear wheel supports 2. Joints of the side armrests 3 and the rear wheel supports 2 are higher than joints of the front wheel supports 1 and the rear wheel supports 2 and joints of the first connecting rods 4 and the rear wheel supports 2. The second connecting rods 5 are respectively rotatably connected with the front wheel supports 1 and lower portions of the first connecting rods 4. The side armrest 3, the lower push rod 62, the first connecting rod 4 and the rear wheel support 2 of each side support 1 form a four-bar linkage. The front wheel support 1, the rear wheel support 2, the first connecting rod 4 and the second connecting rod 5 of each side support 1 form another four-bar linkage.

When the side supports 100 are in the unfolded state, the front wheel supports 1 and the rear wheel supports 2 are unfolded with respect to each other to support, the front wheel supports 1 are supported on the ground via the front wheels 7, the rear wheel supports 2 are supported on the ground via the rear wheels 8, the side armrests 3 and the first connecting rods 4 respectively stand obliquely on the rear wheel supports 2, the push rod assemblies 6 are supported on the side armrests 3 and the upper portion of the first connecting rods 4, and two of and only two connected components of the front wheel supports 1, the rear wheel supports 2, the side armrests 3, the push rod assemblies 6, the first connecting rods 4 and the second connecting rods 5 are locked with each other via the lock mechanism; when the side supports 100 are in the folded state, the lock mechanism are unlocked, and the front wheel support 1, the rear Wheel support 2, the side armrest 3, the push rod assembly 6, the first connecting rod 4, and the second connecting rod 5 of each side support 100 are all drawn close and folded together.

In the present embodiment, each transverse supports 200 comprises a front wheel support connecting rod assembly, a rear wheel support connecting rod assembly and push rod connecting rod assembly. Each front wheel support connecting rod assembly comprises a first outer connecting rod 201 fixedly connected with the front wheel support 1 at the either side of the double stroller and a first inner connecting rod 202 fixedly connected with the front wheel support 1 in the middle of the double stroller, and the first outer connecting rod 201 is rotatably connected with the first inner connecting rod 202; each rear wheel support connecting rod assembly comprises a second outer connecting rod 203 fixedly connected with the rear wheel support 2 at either side of the double stroller and a second inner connecting rod 204 fixedly connected with the rear wheel support 2 in the middle of the double stroller, and the second outer connecting rod 203 is rotatably connected with the second inner connecting rod 204; each push rod connecting rod assemblys comprises a third outer connecting, rod 205 fixedly connected with the push rod assembly 6 at either side of the double stroller and a third inner connecting rod 206 fixedly connected with the push rod assembly 6 in the middle of the double stroller, and the third outer connecting rod 205 is rotatably connected with the third inner connecting rod 206; when the first outer connecting rods 201, the second outer connecting rods 203 and the third outer connecting rods 205 are turned to a direction close to/away from the side support 100 in the middle of the double stroller, the side supports 100 at two sides of the double stroller can be turned to the direction close to/away from the side support 100 in the middle of the double stroller and get folded/unfolded along with the first outer connecting rods 201 the second outer connecting rods 203 and the third outer connecting rods 205.

When the transverse supports 200 are in the folded state, a shaft axis of rotating joint of the first outer connecting rod 201 and the first inner connecting rod 202, a shaft axis of rotating joint of the second outer connecting rod 203 and the second inner connecting rod 204 and a shaft axis of rotating joint of the third outer connecting rod 205 and the third inner connecting rod 206 are parallel, of course it is better that the shaft axis of rotating joint of the first outer connecting rod 201 and the first inner connecting rod 202, the shaft axis of rotating joint of the second outer connecting rod 203 and the second inner connecting rod 204 and the shaft axis of rotating joint of the third outer connecting rod 205 and the third inner connecting rod 206 are collinear. This will cause the side supports 100 on two sides of the double stroller to get closer to each other with respect to the transverse supports 200.

In order to obtain a strong structural stability of the frame in the unfolded state, the transverse supports 200 further comprise connecting rod assemblies of connecting rods, and each connecting rod assembly of connecting rods comprises a fourth outer connecting rod 207 fixedly connected with the first connecting rod 4 at either side of the double stroller and a fourth inner connecting rod 208 fixedly connected with the first connecting rod 4 in the middle of the double stroller, and the fourth outer connecting rod 207 is rotatably connected with the fourth inner connecting rod 208; when the frame is in the folded state, the shaft axis of rotating joint of the first outer connecting rod 201 and the first inner connecting rod 202, the shaft axis of rotating joint of the second outer connecting rod 203 and the second inner connecting rod 204, the shaft axis of rotating joint of the third outer connecting rod 205 and the third inner connecting rod 206 and a shaft axis of rotating joint of the fourth outer connecting rod 207 and the fourth inner connecting rod 208 of the same transverse support 200 are collinear or parallel.

Each connecting rod assembly further comprises a rotation limit mechanism arranged on the outer connecting rod and/or the inner connecting rod for enabling the outer connecting rod to rotate only along one direction when folding, and all outer connecting rods can only be rotated to the front of the inner connecting rods or only be rotated to the rear of the inner connecting rods after the side supports achieve the folding in an up-down direction and in a front-rear direction. In particular, the first outer connecting rods 201 and/or the first inner connecting rods 202 are disposed with first unidirectional rotation limit mechanisms thereon for restricting unidirectional rotation of the first outer connecting rods 201 relative to the first inner connecting rods 202 when the frame is unfolded. The second outer connecting rods 203 and/or the second inner connecting rods 204 are disposed with second unidirectional rotation limit mechanisms thereon for restricting unidirectional rotation of the second outer connecting rods 203 relative to the second inner connecting rods 204 when the frame is unfolded. The third outer connecting rods 205 and/or the third inner connecting rods 206 are disposed with third unidirectional rotation limit mechanisms thereon for restricting unidirectional rotation of the third outer connecting rods 205 relative to the third inner connecting rods 206 when the frame is unfolded. The fourth outer connecting rods 207 and or the fourth inner connecting rods 208 are disposed with fourth unidirectional rotation limit mechanisms thereon for restricting unidirectional rotation of the fourth outer connecting rods 207 relative to the fourth inner connecting rods 208 when the frame is unfolded. The detailed structure of the foregoing respective unidirectional rotation limit mechanisms is not the key point of the present disclosure, taking the first unidirectional rotation limit mechanisms as an example, as long as the first outer connecting rods 201 can only be rotated towards one direction with respect to the first inner connecting rods 202 and cannot be rotated towards another direction when the frame is in the unfolded state, that is, the limit is well. For example, protrusions are provided on end portions of the first inner connecting rods 202, and the first outer connecting rods 201 press against on the protrusions of end portions of the first inner connecting rods 202 when the frame is in the unfolded state.

In the present embodiment, each two adjacent side supports 100 are detachably mounted with a front armrest 9 therebetween, and the front armrest 9 is an U-shaped rod, one end of the front armrest 9 is connected with the side armrest 3 at either side of the double stroller, and the other end thereof is connected with the side armrest 3 in the middle of the double stroller. Before folding the frame, the front armrests 9 are needed to be disassembled.

Each rear wheel support 2 comprises an upper rear support 21 and a lower rear support 22, and a lower portion of the upper rear support 21 is rotatable connected to an upper portion of the lower rear support 22, the front wheel support 1, the first connecting rod 4 and the side armrest 3 are respectively rotatably connected with the upper rear support 21, and the rear wheel 8 are mounted at a lower portion of the lower rear support 22.

When folding the frame, the lock mechanism is unlocked, the side supports 100 are firstly folded, and then the transverse supports 200 are folded after the side supports 100 get folded. The side supports 100 have two kinds of folding patterns, and when the side supports 100 are folded according to a first folding pattern, the upper rear supports 21 and the lower rear supports 22 are relatively unfolded and locked. The upper push rods 61 slid and drawn back inside the lower push rods 62, the front wheel supports 1 are rotated rearwards and get close to the rear wheel supports 2, the push rod assemblies 6 are rotated frontwards and get close to the side armrests 3, and the side armrests 3 are rotated downwards and get close to the rear wheel supports 2. Any one of the front wheel supports 1, the rear wheel supports 2, the side armrests 3, the push rod assemblies 6, the first connecting rods 4, and the second connecting rods 5 moves, and the other ones are driven to move together. The provision of the two four-bar linkages achieves linkage of respective components of the side supports 100, and the folding operation of the side supports is simple and convenient. After folding, the front wheels 7 are on the top of the rear wheels 8. The folding of the side supports 100 achieves the decrease on the volume of the double stroller in the up-down and front-rear directions after the frame is folded, and the structure is compact.

When the side supports 100 are folded according to a second folding pattern, the upper rear supports 21 and the lower rear supports 22 are unlocked with respect to each other, and the lower rear supports 22 are rotated and folded around the joints of the lower rear supports 22 and the upper rear supports 21 and get close to the upper rear supports 21. The upper push rods 61 slid and drawn back inside the lower push rods 62, the front wheel supports 1 are rotated rearwards and get close to the upper rear supports 21, the push rod assemblies 6 are rotated frontwards and get close to the side armrests 3, and the side armrests 3 are rotated downwards and get close to the rear wheel supports 2. Any one of the front wheel supports 1, the upper rear supports 21, the side armrests 3, the push rod assemblies 6, the first connecting rods 4, and the second connecting rods 5 moves, and the other ones are driven to move together. After folding, the front wheels 7 are below the rear wheels 8. Compared with the first folding pattern of the side supports 100, the volume of the folded double stroller in this folding pattern is further reduced.

The transverse supports 200 are folded after the side supports 100 are folded according to one of the two folding patterns of the side supports 100. The first outer connecting rods 201, the second outer connecting rods 203, the third outer connecting rods 205 and the fourth outer connecting rods 207 are turned and drawn back towards the side support 100 in the middle of the double stroller. The side supports 100 at two sides achieve a turn of 90° with respect to the transverse supports 200, and get close to the side support 100 in the middle, and finally, the whole frame are folded. The folding of the transverse supports 200 achieves the decrease on the volume in the left-right direction after the frame is folded, and the structure is more compact.

The double stroller further comprises a handle 10 fixedly disposed on the side support 100 in the middle of the double stroller, and the handle 10 is located between the front wheel support 1 and the side armrest 3 of the side support 100 in the middle of the double stroller. The handle 10 is ring shaped, and an inner bore of the handle 10 extends along the left-right direction of the double stroller. In this way, after the frame of the double stroller is folded, the user may hold the handle 10 to carry the double stroller, which is convenient for carrying, picking and placing.

As above described, the present disclosure is explained according to the purpose thereof, but the present disclosure is not limited to the above-mentioned embodiments and implement methods. Various variations and implementations can be made by the practitioners of the relative technical fields within the technical concept, of the present disclosure.

What is claimed is:

1. A double stroller, comprising a frame with an unfolded state and a folded state, front wheels arranged below a front portion of the frame, rear wheels arranged below a rear portion of the frame, and a lock mechanism for locking the frame in the unfolded state, wherein the frame comprises three side supports arranged in sequence along a left-right direction, and two transverse supports, each two adjacent side supports are connected to each other via one transverse support, each transverse support comprises at least one connecting rod assembly extending along the left-right direction, and each connecting rod assembly comprises an outer connecting rod fixedly connected with the side support on a left or right side and an inner connecting rod fixedly connected with the side support in the middle, the outer connecting rod is connected to the inner connecting rod in a horizontally rotatable manner, such that the side supports on the left and right sides are capable of rotating inward along with the outer connecting rods to draw close to the side support in the middle or rotating outward along with the outer connecting rods to unfold, and when any one of the three side supports is unfolded or folded, the other two side supports are capable of being synchronously unfolded or folded under the driving of the transverse supports, wherein each connecting rod assembly further comprises a rotation limit mechanism arranged on the outer connecting rod and/or the inner connecting rod for enabling the outer connecting rod to rotate only along one direction when folding, and all outer connecting rods are only capable of rotating to the front of the inner connecting rods or only capable of rotating to the rear of the inner connecting rods after the folding of the side supports in an up-down direction and in a front-rear direction is completed.

2. The double stroller according to claim 1, wherein the outer connecting rod is rotatable connected to the inner connecting rod via a rotating shaft, and axis of the rotating shaft extends along an up-down direction.

3. The double stroller according to claim 1, wherein each transverse support comprises at least two connecting rod assemblies, and rotating joints of the outer connecting rods and the inner connecting rods of one same transverse support are collinear in a direction perpendicular to an extension direction of the connecting rod assemblies after the folding of the side supports in an up-down direction and in a front-rear direction is completed.

4. The double stroller according to claim 1, wherein each side support comprises a push rod assembly, a front wheel support with its lower portion connected with the front wheel, and a rear wheel support with its lower portion connected with the rear wheel;
push rod assemblies of two adjacent side supports are connected with one said connecting rod assembly therebetween; and/or,
front wheel supports of two adjacent side supports are connected with one said connecting rod assembly therebetween; and/or,
rear wheel supports of two adjacent side supports are connected with one said connecting rod assembly therebetween.

5. The double stroller according to claim 4, wherein each side support further comprises a side armrest, a first connecting rod and a second connecting rod, an upper portion of the front wheel support and an upper portion of the rear wheel support are rotatably connected, the push rod assembly is connected with the rear wheel support via the first connecting rod, and the first connecting rod is respectively rotatably connected with the rear wheel support and the push rod assembly, the side armrest is respectively rotatably connected with the rear Wheel support and the push rod assembly, the second connecting rod is respectively rotatably connected with the front wheel support and the first connecting rod, and the side armrest, the push rod assembly, the first connecting rod and the rear wheel support of each side support form a four-bar linkage, and the front wheel support, the rear wheel support, the first connecting rod and the second connecting rod of each side support form another four-bar linkage, and only two connected components of the front wheel supports, the rear wheel supports, the side armrests, the push rod assemblies, the first connecting rods and the second connecting rods are locked with each other via the lock mechanism when the side supports are in the unfolded state; and the front wheel support, the rear wheel support, the side armrest, the push rod assembly, the first connecting rod, and the second connecting rod of each side support are all drawn close and folded together when the side supports are in the folded state.

6. The double stroller according to claim 5, wherein the first connecting rods of each two adjacent side supports are connected with one said connecting rod assembly therebetween.

7. The double stroller according to claim 5, wherein upper portions of the first connecting rods are rotatably connected with lower portions of the push rod assemblies, and upper portions of the side armrests are rotatably connected with the push rod assemblies, and joints of the side armrests and the push rod assemblies are higher than joints of the first connecting rods and the push rod assemblies, lower portions of the side armrests are rotatably connected with upper portions of the rear wheel supports, portions near lower ends of the first connecting rods are rotatably connected with the rear wheel supports, and joints of the side armrests and the rear wheel supports are higher than joints of the front wheel supports and the rear wheel supports and joints of the first connecting rods and the rear wheel supports.

8. The double stroller according to claim 5, wherein each push rod assembly comprises a lower push rod with its lower portions rotatably connected with the first connecting rod, and an upper push rod slidably connected with the lower push rod along a length direction of the lower push rod.

9. The double stroller according to claim 8, wherein one of the upper push rod and the lower push rod is slidably inserted into the other one.

10. The double stroller according to claim 5, wherein each rear wheel support comprises an upper rear support and a lower rear support, and a lower portion of the upper rear support is rotatably connected to an upper portion of the lower rear support, the front wheel supports, the first connecting rods and the side armrests are respectively rotatably connected with the upper rear supports, and the rear wheels are mounted at lower portions of the lower rear supports; after the side supports are folded, the upper rear supports and the lower rear supports are relatively unfolded and locked, and the front wheels are located underneath the rear wheels; and/or, the lower rear supports are close to the upper rear supports, and the front wheels are located underneath the rear wheels.

11. The double stroller according to claim 5, wherein each transverse support comprises a front wheel support connecting rod assembly, a rear wheel support connecting rod assembly, a push rod connecting rod assembly, and a connecting rod assembly of connecting rods, and each front wheel support connecting rod assembly comprises a first outer connecting rod fixedly connected with the front wheel support at the left or right side, and a first inner connecting rod fixedly connected with the front wheel support in the middle, and the first outer connecting rod is rotatably connected with the first inner connecting rod; each rear wheel support connecting rod assembly comprises a second outer connecting rod fixedly connected with the rear wheel support at the left or right side and a second inner connecting rod fixedly connected with the rear wheel support in the middle, and the second outer connecting rod is rotatably connected with the second inner connecting rod; each push rod connecting rod assembly comprises a third outer connecting rods fixedly connected with the push rod assembly) at the left or right side and a third inner connecting rod fixedly connected with the push rod assembly in the middle, and the third outer connecting rod is rotatably connected with the third inner connecting rod; each connecting rod assembly of connecting rods comprises a fourth outer connecting rod fixedly connected with the first connecting rod at the left or right side and a fourth inner connecting rod fixedly connected with the first connecting rod in the middle, and the fourth outer connecting rod is rotatably connected with the fourth inner connecting rod.

12. The double stroller according to claim 11, wherein rear side portions of the first outer connecting rods and/or rear side portions of the first inner connecting rods are disposed with first rotation limit mechanisms thereon; rear side portions of the second outer connecting rods and/or rear side portions of the second inner connecting rods are disposed with second rotation limit mechanisms thereon; rear side portions of the third outer connecting rods and/or rear side portions of the third inner connecting rods are disposed with third rotation limit mechanisms thereon; rear side portions of the fourth outer connecting rods and/or rear side portions of the fourth inner connecting rods are disposed with fourth rotation limit mechanisms thereon.

13. The double stroller according to claim 11, wherein when the transverse supports are folded, a shall axis of rotating joint of the first outer connecting rod and the first inner connecting rod, a shaft axis of rotating joint of the second outer connecting rod and the second inner connecting rod, a shaft axis of rotating joint of the third outer connecting rod and the third inner connecting rod and a shaft axes of rotating joint of the fourth outer connecting rod and the fourth inner connecting rod of one same transverse support are collinear or parallel.

14. The double stroller according to claim 5, wherein each two adjacent side supports are detachably mounted with a front armrest therebetween, the front armrest is an U-shaped rod, one end of the front armrest is connected with the side armrest at the left or right side, and the other end thereof is connected with the side armrest in the middle.

15. The double stroller according to claim 5, wherein the double stroller further comprises a handle fixedly disposed on the side support in the middle of the double stroller, and the handle is located between the front wheel support and the side armrest of the side support in the middle of the double stroller.

16. The double stroller according to claim 15, wherein the handle is ring shaped.

* * * * *